US012752819B2

(12) United States Patent
Park

(10) Patent No.: US 12,752,819 B2
(45) Date of Patent: Oct. 6, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventor: Chi Hong Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 273 days.

(21) Appl. No.: 18/517,697

(22) Filed: Nov. 22, 2023

(65) Prior Publication Data

US 2025/0002055 A1 Jan. 2, 2025

(30) Foreign Application Priority Data

Jun. 28, 2023 (KR) ........................ 10-2023-0083578

(51) Int. Cl.
*B60W 60/00* (2020.01)
*B60N 2/02* (2006.01)
(Continued)

(52) U.S. Cl.
CPC ....... *B60W 60/0059* (2020.02); *B60N 2/0244* (2013.01); *B60R 22/48* (2013.01); (Continued)

(58) Field of Classification Search
CPC ........... B60W 60/0059; B60W 30/143; B60W 30/18109; B60W 50/082; B60W 50/16; B60W 60/0015; B60W 60/0051; B60W 60/0053; B60W 2050/146; B60W 2540/223; B60W 2050/143; B60W 50/14; B60W 10/18; B60W 40/105;
(Continued)

(56) References Cited

U.S. PATENT DOCUMENTS 12,020,572 B2 * 6/2024 Nakazono ........ G08G 1/096783
2011/0054756 A1 3/2011 Hecker et al.
(Continued)

FOREIGN PATENT DOCUMENTS

KR 102396993 B1 5/2022
KR 10-2022-0074568 A 6/2022
(Continued)

*Primary Examiner* — Jason Holloway
*Assistant Examiner* — Madison B Emmett
(74) *Attorney, Agent, or Firm* — Banner & Witcoff, Ltd.

(57) ABSTRACT

Disclosed is an apparatus for autonomous driving control. The apparatus may include a feedback device including a first feedback device and a second feedback device, a memory, and a control device. For example, the apparatus may detect an event related to a transition of control authority of a host vehicle in an autonomous driving mode, may determine whether the first feedback device is operating in a normal state based on failing to receive a response regarding the transition of the control authority from a user during a first time period, may output a first feedback via the first feedback device, based on a determination that the first feedback device is operating in the normal state, and may output a second feedback via the second notification device based on a determination that the first first feedback device is not operating in the normal state.

20 Claims, 9 Drawing Sheets

(51) Int. Cl.

| | |
|---|---|
| ***B60R 22/48*** | (2006.01) |
| ***B60W 30/14*** | (2006.01) |
| ***B60W 30/18*** | (2012.01) |
| ***B60W 50/08*** | (2020.01) |
| ***B60W 50/14*** | (2020.01) |
| ***B60W 50/16*** | (2020.01) |

(52) U.S. Cl.

CPC .... *B60W 30/143* (2013.01); *B60W 30/18109* (2013.01); *B60W 50/082* (2013.01); *B60W 50/16* (2013.01); *B60W 60/0015* (2020.02); *B60W 60/0051* (2020.02); *B60W 60/0053* (2020.02); *B60W 2050/146* (2013.01)

(58) Field of Classification Search

CPC ......... B60W 40/107; B60W 2050/007; B60W 2520/10; B60N 2/0244; B60N 2/02; B60R 22/48

See application file for complete search history.

(56) References Cited

U.S. PATENT DOCUMENTS

| | | | | |
|---|---|---|---|---|
| 2013/0342336 | A1* | 12/2013 | Kiefer .................... | B60Q 9/008 340/436 |
| 2019/0315376 | A1* | 10/2019 | Seo ...................... | G05D 1/0061 |
| 2022/0169288 | A1 | 6/2022 | Kim | |
| 2023/0406343 | A1* | 12/2023 | Oman ................. | B60W 40/105 |
| 2024/0336274 | A1 | 10/2024 | Park et al. | |

FOREIGN PATENT DOCUMENTS

| | | | |
|---|---|---|---|
| KR | 10-2024-0151300 | A | 10/2024 |
| WO | 2009/124739 | A1 | 10/2009 |

* cited by examiner

APPARATUS FOR CONTROLLING AUTONOMOUS DRIVING AND METHOD THEREOF

CROSS-REFERENCE TO RELATED APPLICATION

This application claims the benefit of priority to Korean Patent Application No. 10-2023-0083578, filed in the Korean Intellectual Property Office on Jun. 28, 2023, the entire contents of which are incorporated herein by reference.

TECHNICAL FIELD

The present disclosure relates to an autonomous driving control apparatus and a method thereof, and more particularly, relates to a technology for providing a user with information about a transition of control authority related to autonomous driving based on a driving environment in an autonomous driving control situation of a host vehicle depending on various methods.

BACKGROUND

As autonomous driving vehicles are gradually spread, various technologies related to autonomous driving are being developed. The autonomous driving may be divided into partial autonomous driving, conditional autonomous driving, highly autonomous driving, and/or fully autonomous driving depending on a control level.

Meanwhile, in a specific driving situation of a host vehicle, it may transfer control authority of a host vehicle to a user during autonomous driving control of the host vehicle. For example, in a specific situation, it switch a driving mode from an autonomous driving mode to a manual driving mode. Accordingly, an autonomous driving control apparatus may display a notification about a transition of the control authority of the host vehicle to the user.

An autonomous driving control apparatus may use various components to inform the user of the necessity of switching a driving mode of the host vehicle. For example, the autonomous driving control apparatus may change acceleration by differently applying the braking force of at least one tire while driving and thus may provide a haptic warning to the user. Accordingly, the user may perceive that the control authority of the host vehicle needs to be transferred, through the haptic warning. For another example, the autonomous driving control apparatus may provide a notification about a transition of control authority by using an actuator disposed in a seat of the host vehicle. In particular, the autonomous driving control apparatus may deliver the intent for transferring the control authority of the host vehicle to the user by generating vibration using the actuator.

However, the above method may be disadvantageous in terms of driving comfort or manufacturing cost of the host vehicle. For example, the manufacturing cost of the host vehicle may increase due to the cost required to install and add an actuator to a seat. In addition or alternative, in a situation in which a notification device (e.g., a haptic device) provided in the host vehicle does not operate normally (e.g., a situation in which the notification device is broken), a proper notification providing function may not be performed even though it is necessary to provide a notification to the user.

SUMMARY

According to the present disclosure, an apparatus for autonomous driving control, the apparatus may comprise: a feedback device including a first feedback device and a second feedback device; a memory configured to store instructions; and a control device operatively connected to the feedback device and the memory, wherein the instructions, when executed by the control device, may cause the apparatus to: detect an event related to a transition of control authority of a host vehicle in an autonomous driving mode; based on failing to receive a response regarding the transition of the control authority from a user during a first time period, determine whether the first feedback device is operating in a normal state; based on a determination that the first feedback device is operating in the normal state, output a first feedback via the first feedback device; and based on a determination that the first feedback device is not operating in the normal state, output a second feedback via the second feedback device.

The apparatus, wherein the instructions, when executed by the control device, may cause the apparatus to: based on failing to receive the response regarding the transition of the control authority from the user during a second time period, output the second feedback via the second feedback device, wherein the second time period is associated with a feedback output time of the first feedback device; and while outputting the second feedback, control the host vehicle based on a first including an operation of minimum risk maneuver (MRM) decelerating a driving speed of the host vehicle with a first deceleration.

The apparatus, wherein the instructions, when executed by the control device, may cause the apparatus to: based on failing to receive the response regarding the transition of the control authority from the user during a third time period, output a plurality of feedbacks via both the first feedback device and the second feedback device, wherein the third time period is associated with a feedback output time of the second feedback device.

The apparatus may further comprise: a display device, wherein the instructions, when executed by the control device, may cause the apparatus to: output, by using the display device, information about at least one of: the event related to the transition of the control authority, the first feedback, the second feedback, or a combination of the event, the first feedback, and the second feedback.

The apparatus, wherein the instructions, when executed by the control device, may cause the apparatus to: based on an occurrence of an operating error of the apparatus, an unpredictable situation, or a combination of the operating error and the unpredictable situation in the autonomous driving mode, output a third feedback via at least one of the first feedback device or the second feedback device.

The apparatus, wherein the instructions, when executed by the control device, may cause the apparatus to: while outputting the first feedback, control the host vehicle based on a second minimum risk maneuver (MRM) including an operation of decelerating a driving speed of the host vehicle with a second deceleration greater than a first deceleration associated with a first MRM.

The apparatus, wherein the instructions, when executed by the control device, may cause the apparatus to: based on the first feedback device operating in the normal state, output the first feedback by performing at least one of: adjusting a length of a safety belt associated with the user, generating vibration in a seat associated with the user, or a combination of the adjusting of the length of the safety belt and the generating the vibration.

The apparatus, wherein the instructions, when executed by the control device, may cause the apparatus to: based on the first feedback device not operating in the normal state, output the second feedback by performing at least one of: changing a backrest angle of a seat associated with the user based on a specified period, repeatedly applying braking force of a specified magnitude to the host vehicle, or a combination of the changing of the backrest angle and the repeatedly applying of the braking force.

The apparatus, wherein the instructions, when executed by the control device, may cause the apparatus to: output the second feedback by repeatedly applying the braking force of the specified magnitude in a form of a pulse by using the second feedback device.

The apparatus, wherein the instructions, when executed by the control device, may cause the apparatus to: based on receiving the response regarding the transition of the control authority from the user during the first time period or the second time period, turn off the feedback device and deactivate the autonomous driving mode.

According to the present disclosure, an method for autonomous driving control, the method may comprise: detecting, by a control device, an event related to a transition of control authority of a host vehicle in an autonomous driving mode; based on failing to receive a response regarding the transition of the control authority from a user during a first time period, determining, by the control device, whether a first feedback device is operating in a normal state; and based on a determination that the first feedback device is not operating in the normal state, controlling, by the control device, output of a second feedback via a second feedback device, wherein the second feedback is different from a first feedback associated with the first feedback device.

The method may further comprise: based on failing to receive the response regarding the transition of the control authority from the user during a second time period, controlling, by the control device, output of the second feedback, wherein the second time period is associated with a feedback output time of the first feedback device; and while outputting the second feedback, controlling, by the control device, the host vehicle based on a first minimum risk maneuver (MRM) including an operation of decelerating a driving speed of the host vehicle with a first deceleration.

The method may further comprise: based on failing to receive the response regarding the transition of the control authority from the user during a third time period, controlling, by the control device, output of a plurality of feedbacks via both the first feedback device and the second feedback device, wherein the third time period is associated with a feedback output time of the second feedback device.

The method may further comprise: controlling, by the control device and by using a display device, output of information about at least one of: the event related to the transition of the control authority, the first feedback, the second feedback, or a combination of the event, the first feedback, and the second feedback.

The method may further comprise: based on an occurrence of an operating error of an autonomous driving control apparatus, an unpredictable situation, or a combination of the operating error and the unpredictable situation in the autonomous driving mode, controlling, by the control device, output of a third feedback via at least one of the first feedback device or the second feedback device.

The method may further comprise: while outputting the first feedback, controlling, by the control device, the host vehicle based on a second minimum risk maneuver (MRM) including an operation of decelerating a driving speed of the host vehicle with a second deceleration greater than a first deceleration associated with a first MRM.

The method may further comprise: controlling, by the control device, output of the first feedback by performing at least one of: adjusting a length of a safety belt associated with the user, generating vibration in a seat associated with the user, or a combination of the adjusting of the length of the safety belt and the generating the vibration.

The method, wherein the controlling of the output of the second feedback may comprise: controlling, by the control device, the output of the second feedback by performing at least one of: changing a backrest angle of a seat associated with the user based on a specified period, repeatedly applying braking force of a specified magnitude to the host vehicle, or a combination of the changing of the backrest angle and the repeatedly applying of the braking force.

The method, wherein the repeatedly applying the braking force may comprise: repeatedly applying, by the control device, the braking force of the specified magnitude in a form of a pulse by using the second feedback device.

The method may further comprise: based on receiving the response regarding the transition of the control authority from the user during the first time period or the second time period, turning off the first feedback device and the second feedback device and deactivating the autonomous driving mode.

BRIEF DESCRIPTION OF THE DRAWINGS

The above and other objects, features and advantages of the present disclosure will be more apparent from the following detailed description taken in conjunction with the accompanying drawings.

Figure 1:
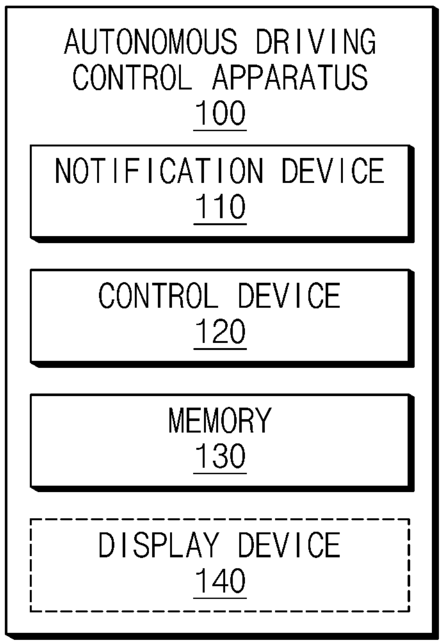
FIG. 1 shows an example of components of an autonomous driving control apparatus, according to an example of the present disclosure.

With regard to description of drawings, the same or similar components will be marked by the same or similar reference signs.

DETAILED DESCRIPTION

Hereinafter, some examples of the present disclosure will be described in detail with reference to the accompanying drawings. In the drawings, the same reference numerals will be used throughout to designate the same or equivalent elements. In addition or alternative, a detailed description of well-known features or functions will be ruled out in order not to unnecessarily obscure the gist of the present disclosure.

In describing elements of an example of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 9.

FIG. 1 shows an example of components of an autonomous driving control apparatus, according to an example of the present disclosure.

According to an example, an autonomous driving control apparatus 100 may include at least one of a notification device 110, a control device 120, a memory 130, a display device 140, or any combination thereof. The configuration of the autonomous driving control apparatus 100 shown in FIG. 1 is an example, and examples of the present disclosure are not limited thereto. For example, the autonomous driving control apparatus 100 may further include components (e.g., at least one of an interface device, a communication device, a sensor device, or any combination thereof) not shown in FIG. 1.

According to an example, the notification device 110 includes at least one notification device and may provide a notification function to a user.

For example, the notification device 110 may include a first notification device and a second notification device.

For example, the first notification device may include at least one device that directly and/or indirectly provides a notification to at least part of the body of a user riding a host vehicle. The first notification device may include, for example, at least one of a safety belt length adjusting device, a seat vibrator, or any combination thereof. For example, the safety belt length adjusting device may perform a safety belt length adjusting function of winding or extending the length of a safety belt corresponding to at least one seat of the host vehicle. For example, the seat vibrator may include a vibration device that vibrates at least a partial region (e.g., a cushion) of a seat on which a user who is to be provided with a notification is riding.

For example, the second notification device may include at least one device that provides a notification by providing a change that the user is capable of feeling through a vestibular organ. The second notification device may include, for example, at least one of a seat backrest angle adjusting device, a braking device (e.g., a host vehicle speed adjusting device), or any combination thereof. For example, the seat backrest angle adjusting device may perform a seat angle adjusting function of tilting or erecting an angle of at least one seat of the host vehicle. For example, the braking device may adjust the driving speed of the host vehicle by repeatedly applying braking force having a specified magnitude in a specified form (e.g., a pulse form) to a driving device (e.g., a motor) of the host vehicle.

For example, the notification device 110 may perform a notification function having various stages under control of the control device 120. For example, the notification device 110 may perform a notification function having a plurality of stages in which one of intensity, period, or any combination thereof of the safety belt length adjusting function using the safety belt length adjusting device is differently applied. For notification device 110 may perform the example, the notification function having a plurality of stages in which at least one of an angle range, the angle change period, or any combination thereof of the seat angle adjusting function using the seat angle adjusting device is differently applied.

For example, the notification device 110 may selectively perform a first stage notification and/or a second stage notification.

For example, the first stage notification may include an operation of adjusting a length of a safety belt with a first intensity based on a first period by using the safety belt length adjusting device. The first period may include, for example, a first retraction section for winding a safety belt with a first intensity, and a first idle section. The first retraction section and/or the first idle section may be a set value changeable by a user and/or a producer. For example, the first stage notification may include an operation of generating vibration in at least part of a seat with a first intensity based on a first period by using a seat vibrator.

For example, if the second notification device included in the notification device 110 does not operate normally (e.g., if it is broken), the second stage notification may include an operation of adjusting a length of the safety belt with a second intensity greater than the first intensity by using the safety belt length adjusting device, based on the second period smaller than the first period. The second period may include, for example, a second retraction section for winding a safety belt with a second intensity, and a second idle section. Each of the second retraction section and the second idle section may be a set value changeable by a user and/or a producer. For example, the second stage notification may include an operation of generating vibration in at least part of a seat with a second intensity based on a second period by using a seat vibrator. In other words, the second stage notification may include a notification having a shorter period and/or stronger strength than the first stage notification described above.

For example, if the first notification device included in the notification device 110 does not operate normally (e.g., if it is broken), the first stage notification may include an operation of adjusting the angle of the seat in a first angle section based on a third period by using the seat angle adjusting device. The first stage notification using the seat angle adjusting device may include, for example, an operation of gradually and repeatedly changing the angle of the seat in a range between a minimum value of the first angle section and a maximum value of the first angle section. The third period may be a set value changeable by the user and/or producer. For example, the first a stage notification may include notification operation that allows the user to feel a sense of difference while driving by repeatedly applying braking force of a specified magnitude and a specified form (e.g., a pulse form) to the host vehicle by using a braking device.

For example, the second stage notification may include an operation for adjusting the angle of a seat in a second angle section wider than the first angle section by using the seat angle adjusting device based on a fourth period less than the third period. The second stage notification using the seat angle adjusting device may include an operation of gradually and repeatedly changing the angle of the seat in a range between the minimum value of the second angle section and the maximum value of the second angle section. The fourth period may be a set value changeable by a user and/or a producer. For example, the second stage notification may include a notification operation that allows the user to feel a sense of difference while driving by repeatedly applying a braking force of a magnitude, which is larger than the first stage notification, and a specified form (e.g., a pulse form) to the host vehicle by using a braking device.

For example, the notification device 110 may perform a notification function based on various types of control signals. For example, the notification device 110 may perform a notification function of some of a plurality of stages based on a control signal including at least one of a ramp-up signal, a step signal, a sinusoidal signal, or any combination thereof.

According to an example, the control device 120 may be operatively connected to the notification device 110, the memory 130, and/or the display device 140. For example, the control device 120 may control operations of the notification device 110, the memory 130, and/or the display device 140.

For example, the control device 120 may control the host vehicle in an autonomous driving mode based on one autonomous driving stage among the plurality of autonomous driving stages. For example, while controlling the host vehicle in an autonomous driving mode based on a specified autonomous driving stage (e.g., level 3), the control device 120 may identify that an event related to a transition of control authority of the host vehicle occurs.

For example, the event related to the transition of control authority of the host vehicle may include information about a driving situation of the host vehicle. For example, the event may include at least one of the traffic volume of a road on which the host vehicle is driving, the driving speed of the host vehicle, the driving state of a vehicle in front of the host vehicle, or any combination thereof. For example, the event may include predefined reference parameters. In other words, the event may include various pieces of information about the driving situation of the host vehicle stored in advance.

For example, if the control device 120 fails to receive a response regarding a transition of control authority from the user during a first time (e.g., 4 seconds) based on identifying that an event has occurred, the control device 120 may identify an operating state of a notification device (e.g., the first notification device) identified based on a predetermined priority among a plurality of notification devices included in the notification device 110. For example, the control device 120 may determine whether the first notification device is normally operating.

For example, if it is determined that the first notification device is operating normally, the control device 120 may perform a notification (e.g., a first stage notification) by using at least part of the first notification device. For example, if the first notification device is operating normally, the control device 120 may provide a first stage notification including at least one of providing a user with a notification regarding a transition of control authority by adjusting (e.g., retracting) the length of the safety belt corresponding to a user by using the first notification device, providing the user with a notification regarding a transition of control authority by generating vibration in a seat, in which the user is riding, by using the first notification device, or any combination thereof.

For example, if it is determined that the first notification device is not operating normally, the control device 120 may provide a notification by using another notification device other than the first notification device among a plurality of notification devices included in the notification device 110. For example, there are the plurality of remaining notification devices, the control device 120 may perform a notification (e.g., a first stage notification) by using a notification device (e.g., a second notification device) identified based on a set priority. In this case, the control device 120 may provide a second stage notification by continuously using the second notification device similarly to the second stage notification, which will be described later. For example, the second stage notification using the second notification device may include a notification having a shorter period and/or stronger strength than the first stage notification described above. For example, if the first notification device is not operating normally, the control device 120 may provide a first stage notification including at least one of providing a user with a notification regarding a transition of control authority by changing a backrest angle of a seat corresponding to the user based on the specified period by using the second notification device, repeatedly applying the braking force of a specified magnitude to the host vehicle by using a second notification device, or any combination thereof. The braking force may be generated based on, for example, a control signal having a specified magnitude in the form of a pulse.

For example, if a response is received from the user within the first time, the control device 120 may turn off the notification device 110, may transfer the control authority of the host vehicle to the user, and may terminate the autonomous driving control for the host vehicle.

For example, if the control device 120 does not receive a response regarding a transition of control authority from the user during a second time (e.g., 6 seconds) from the time of performing the first stage notification, the control device 120 may provide a second stage notification by using at least one notification device among the plurality of notification devices included in the notification device 110. For example, if the first stage notification is provided by using the first notification device, the control device 120 may provide a second stage notification by using at least one notification device (e.g., the second notification device) among the remaining notification other the first devices than notification device. For example, if a situation such as a case where the second notification device is out of order is identified, the control device 120 may provide the second stage notification by continuously using the first notification device. In this case, the control device 120 may provide the second stage notification by changing at least one of the intensity, period, or any combination thereof of the first stage notification by using the first notification device. For example, the second stage notification using the first notification device may include a notification having a shorter than period and/or stronger strength the first stage notification described above.

For example, if a response is received from the user within the second time, the control device 120 may turn off the notification device 110, may transfer the control authority of the host vehicle to the user, and may terminate the autonomous driving control for the host vehicle.

For example, the response regarding the transition of control authority may include at least one of steering wheel control of the host vehicle, pressure on an accelerator pedal and/or brake pedal of the host vehicle, a touch input to a display of the host vehicle, a manual seat angle adjustment input that is continuously generated beyond a predefined time, or any combination thereof.

For example, while performing the second stage notification by using the notification device 110, the control device 120 may control the driving speed of the host vehicle. For example, while providing the second stage notification to the user by using the second notification device, the control device 120 may control the host vehicle based on a first minimum risk maneuver (MRM) that decelerates the driving speed of the host vehicle to the first acceleration (e.g., $-1\ m/s^2$).

For example, if the control device 120 fails to receive a response regarding the transition of control authority from the user during a third time from a point in time if the second stage notification starts to be provided, the control device 120 may provide a third stage notification to the user. For example, the third stage notification may include a notification provided to the user by using both the first notification device and the second notification device. For example, the third stage notification may include a notification provided with a shorter period and/or stronger strength than the second stage notification by using the first notification device. For example, the third stage notification may include a notification provided with a shorter period and/or stronger strength than the second stage notification by using the second notification device.

For example, the control device 120 may provide a user with various pieces of information related to driving control of the host vehicle by using the display device 140. For example, the control device 120 may provide the user with information about at least one of an event related to a transition of control authority, the first stage notification, the second stage notification, a notification function being provided, whether an autonomous driving mode is released, or any combination thereof, through visual and/or auditory content by using the display device 140.

For example, while controlling the host vehicle in an autonomous driving mode based on the autonomous driving stage having the specified stage, the control device 120 may identify an emergency situation. For example, the emergency situation may include a situation different from the event related to the transition of the above-described control authority. In other words, the emergency situation may include a driving situation not previously stored. For example, the emergency situation may include at least one of an operating error of the autonomous driving control apparatus 100, an unpredictable situation (e.g., at least one of an accident, a lane departure, an intruding vehicle, an external environment change, or any combination thereof) related to driving of the host vehicle, or any combination thereof.

For example, if the emergency situation is identified, the control device 120 may provide a notification immediately by using the first notification device. For example, the control device 120 may omit the waiting time of the first time and/or the execution of the first stage notification and may immediately perform the second stage notification. For example, while performing the second stage notification based on the occurrence of an emergency situation, the control device 120 may control the host vehicle based on the second MRM that decelerates the driving speed of the host vehicle to a second acceleration (e.g., $-4\ m/s^2$) greater than the first acceleration.

The numerical values described with respect to the above the first time, the second time, the first acceleration, and the second acceleration are merely illustrative, and examples of the present disclosure are not limited thereto. For example, the second acceleration may be $-5\ m/s^2$. For example, the first time and the second time may be a set value changeable by a user and/or a manufacturer's settings.

According to an example, the memory 130 may store instructions or data. For example, the memory 130 may store one or more instructions that cause the autonomous driving control apparatus 100 to perform various operations when executed by the control device 120.

For example, the memory 130 and the control device 120 may be implemented as one chipset. The control device 120 may include at least one of a communication processor or a modem.

For example, the memory 130 may store various pieces of information related to the autonomous driving control apparatus 100. For example, the memory 130 may store information about the operation history of the control device 120. For example, the memory 130 may store information related to states and/or operations of components (e.g., at least one of an engine control unit (ECU), the notification device 110, the control device 120, the display device 140, or any combination thereof) of the host vehicle.

According to an example, the display device 140 may include at least one output device. For example, the display device 140 may include an output device (e.g., a display and/or a speaker) included in at least part of the interior of the host vehicle.

For example, the display device 140 may provide the user with various pieces of information about the driving situation of the host vehicle through visual and/or auditory content.

For example, the display device 140 may output information about various pieces of driving information (e.g., at least one of an event related to a transition of control authority, an emergency situation, or any combination thereof) generated while the host vehicle is driving in the autonomous driving mode in real time.

For example, under control of the control device 120, the display device 140 may output information about a notification function performed through the notification device 110 in real time. The display device 140 may provide the user with information about at least one of, for example, the event related to the transition of control authority, a notification using the first notification device, a notification using the second notification device, or any combination thereof through visual and/or auditory content.

Figure 2:
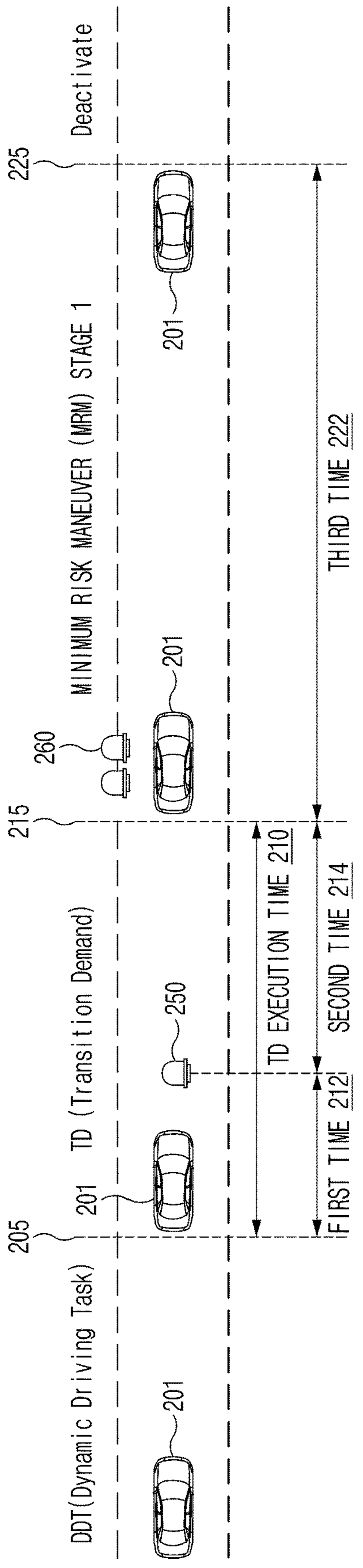
FIG. 2 shows an example of an operation of an autonomous driving control apparatus, according to an example of the present disclosure.

FIG. 2 shows an example of an operation of an autonomous driving control apparatus, according to an example of the present disclosure.

According to an example, an autonomous driving control apparatus (e.g., the autonomous driving control apparatus 100 of FIG. 1) may control a host vehicle 201 in an autonomous driving mode. For example, the autonomous driving control apparatus may control the host vehicle 201 in the autonomous driving mode based on an autonomous driving stage having a specified stage (e.g., level 3) or higher.

According to an example, while controlling the host vehicle 201 in the autonomous driving mode based on the autonomous driving mode (e.g., a dynamic driving task (DDT)), the autonomous driving control apparatus may identify that an event related to a transition of control authority of the host vehicle 201 occurs at a first time point 205.

According to an example, at the first time point 205, the autonomous driving control apparatus may display information about the transition of control authority to the user based on identifying the occurrence of the event. For example, the autonomous driving control apparatus may provide the user with various pieces of information indicating the need for user control, by using a display device (e.g., the display device 140 in FIG. 1).

According to an example, if not receiving a response regarding the transition of control authority from the user during first time 212, the autonomous driving control apparatus may determine whether a first notification device determined based on a specific priority among a plurality of notification devices included in a notification device (e.g., the notification device 110 in FIG. 1) operates normally. For example, if the first notification device is operating normally, the autonomous driving control apparatus may perform a first stage notification 250 by using the first notification device. For example, if the first notification device is not operating normally (e.g., if the first notification device is broken), the autonomous driving control apparatus may perform the first stage notification 250 by using a notification device (e.g., a second notification device) determined based on a specific priority. For example, if receiving a response regarding the transition of control authority from the user during the first time 212, the autonomous driving control apparatus may transfer the control authority of the host vehicle 201 to the user and then may terminate control of autonomous driving mode.

For example, the first stage notification 250 using the first notification device may include a notification function including at least one of adjusting the length of a safety belt corresponding to the user, generating vibration in the seat in which the user is riding, or any combination thereof.

For example, the stage notification 250 using the first notification device may include an operation of adjusting a length of a safety belt with a first intensity based on a first period by using the safety belt length adjusting device. The first period may include, for example, a first retraction section for winding a safety belt with a first intensity, and a first idle section. The first retraction section and/or the first idle section may be a set value changeable by a user and/or a producer.

For example, the first stage notification 250 using the first notification device may include an operation of generating vibration in at least one area (e.g., a cushion) of a seat, in which the user is riding, with a first intensity based on a first period by using a seat vibrator.

For example, if the first notification device fails at a point in time if the first stage notification 250 needs to be provided, the autonomous driving control apparatus may provide the first stage notification 250 by using another notification device (e.g., a second notification device). For example, the first stage notification 250 using the second notification device may include a notification function of at least one of changing the backrest angle of the seat corresponding to the user based on a specified period, repeatedly applying braking force of a specified magnitude to the host vehicle, or any combination thereof.

For example, the stage notification 250 using the second notification device may include an operation for adjusting a backrest angle of a seat within a specified angle section by using the seat backrest angle adjusting device, based on the specified period. The first stage notification 250 using the seat backrest angle adjusting device may include, for example, an operation of gradually and repeatedly changing the angle of the seat in a range between a minimum value of a specified angle section and a maximum value of the specified angle section. For example, the specified period may be a set value changeable by a user and/or a producer.

For example, the first stage notification 250 using the second notification device may include an operation of repeatedly applying the braking force of a specified magnitude to the host vehicle 201 by using a braking device. The first stage notification 250 using a braking device may include, for example, an operation of decelerating the driving speed of the host vehicle 201 based on a control signal having a pulse form based on a specified magnitude.

For example, the first stage notification 250 may be performed on the premise that the autonomous driving control apparatus identifies that the user is seated with the seat belt the autonomous fastened. In other words, driving control apparatus may continuously identify whether the seat belt is fastened after the first time point 205. If it is identified that the user is seated with the seat belt fastened, the autonomous driving control apparatus may normally perform the first stage notification 250.

According to an example, if failing to receive a response regarding the transition of control authority from the user during a second time 214 from a point in time if the first stage notification 250 is performed, the autonomous driving control apparatus may perform a second stage notification 260 by using a notification device. For example, if receiving a response regarding the transition of control authority from the user during the second time 214, the autonomous driving control apparatus may transfer the control authority of the host vehicle 201 to the user and then may terminate control of autonomous driving mode.

For example, the second stage notification 260 using the second notification device may include a notification function of at least one of changing the backrest angle of the seat corresponding to the user based on a specified period, repeatedly applying braking force of a specified magnitude to the host vehicle, or any combination thereof.

For example, the second stage notification 260 using the second notification device may include an operation for adjusting a backrest angle of a seat within a specified angle section by using the seat backrest angle adjusting device, based on the specified period. The second stage notification 260 using the seat backrest angle adjusting device may include, for example, an operation of gradually and repeatedly changing the angle of the seat in a range between a minimum value of a specified angle section and a maximum value of the specified angle section. For example, the seat backrest angle adjusting device according to the second stage notification 260 may control the backrest angle of a seat within a shorter period and wider angle section than in the first stage notification 250.

For example, the second stage notification 260 using the second notification device may include an operation of repeatedly applying the braking force of a specified magnitude to the host vehicle 201 by using a braking device. The second stage notification 260 using a braking device may include, for example, an operation of decelerating the driving speed of the host vehicle 201 based on a control signal having a pulse form based on a specified magnitude. For example, the braking device according to the second stage notification 260 may repeatedly decelerate the driving speed of the host vehicle 201 based on a stronger level (e.g., greater deceleration) than in the first stage notification 250.

For example, if the second notification device fails at a point in time if the second stage notification 260 needs to be provided, the autonomous driving control apparatus may provide the second stage notification 260 by using another notification device (e.g., a first notification device). For example, the second stage notification 260 using the first notification device may include a notification function including at least one of adjusting the length of a safety belt corresponding to the user, generating vibration in the seat in which the user is riding, or any combination thereof.

For example, the second stage notification 260 using the first notification device may include an operation for adjusting the length of the safety belt with a second intensity greater than the first intensity by using the safety belt length adjusting device based on the second period shorter than the first period.

For example, the second stage notification 260 using the first notification device may include an operation of generating vibration in at least one area (e.g., a cushion) of a seat, in which the user is riding, with a second intensity based on a second period by using a seat vibrator.

According to an example, a time from the first time point 205, which is a time point at which an event related to the transition of control authority occurs, to a second time point 215, which is a time point at which the second stage notification 260 is executed, may be defined as a transition demand (TD) execution time 210. For example, the TD execution time 210 may be defined as a limit time for informing the user that the transition of control authority is necessary. If the limit time is exceeded, the autonomous driving control apparatus may reduce the driving speed of the host vehicle 201.

According to an example, while the autonomous driving control apparatus is performing the second stage notification 260, the autonomous driving control apparatus may control the host vehicle 201 based on a first MRM (or MRM stage 1) including an operation of decelerating the driving speed of the host vehicle 201 to a first acceleration.

According to an example, during a third time 222, which is a time from the second time point 215, which is the time point at which the second stage notification 260 is executed, to a third time point 225 if the driving speed of the host vehicle 201 is less than a specified value (e.g., 0 m/s), the autonomous driving control apparatus may reduce the driving speed of the host vehicle 201. Moreover, the autonomous driving control apparatus may provide the user with at least one of a driving situation of the host vehicle 201, information indicating that a transition of control authority is required, or any combination thereof by using a display device (e.g., the display device 140 in FIG. 1) through visual and/or auditory content.

According to an example, while performing the first stage notification 250 or the second stage notification 260, the autonomous driving control apparatus may receive a manual seat angle adjustment input from the user.

For example, while performing the first stage notification 250 or the second stage notification 260 by using a seat angle adjusting device, the autonomous driving control apparatus may receive the manual seat angle adjustment input from the user that lasts during a specific time.

For example, if the specific time, during which the manual seat angle adjustment input continues, exceeds the predefined time, the autonomous driving control apparatus may identify that the corresponding manual seat angle adjustment regarding a transition of control input is response intent authority to the user, and may terminate (or release) autonomous driving control for the host vehicle 201.

For example, if the specific time, during which the manual seat angle adjustment input continues, is not greater the autonomous driving control than the pre-defined time, apparatus may continuously provide a notification or may perform autonomous driving control.

According to an example, if failing to receive a response regarding the transition of control authority until the third time point 225, the autonomous driving control apparatus may terminate driving of the host vehicle 201. For example, the autonomous driving control apparatus may decelerate the driving speed of the host vehicle 201 to zero, and may deactivate driving of the host vehicle 201 and/or autonomous driving control of the autonomous driving control apparatus.

Figure 3:
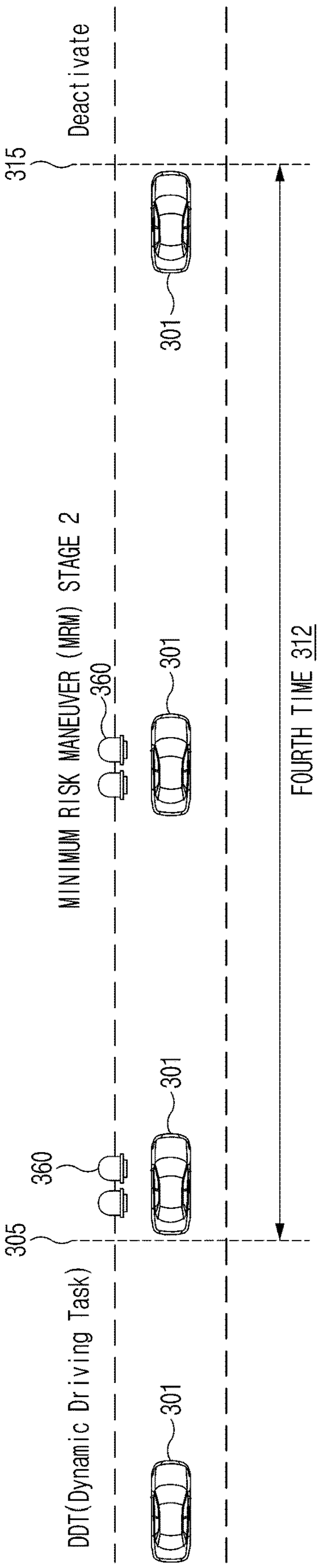
FIG. 3 shows an example of an operation of an autonomous driving control apparatus, according to an example of the present disclosure.

FIG. 3 shows an example of an operation of an autonomous driving control apparatus, according to an example of the present disclosure.

According to an example, an autonomous driving control apparatus (e.g., the autonomous driving control apparatus 100 of FIG. 1) may control a host vehicle 301 in an autonomous driving mode. For example, the autonomous driving control apparatus may control the host vehicle 301 in the autonomous driving mode based on an autonomous driving stage having a specified stage (e.g., level 3) or higher.

According to an example, while controlling the host vehicle 301 in the autonomous driving mode based on the autonomous driving mode (e.g., a dynamic driving task (DDT)), the autonomous driving control apparatus may identify that an emergency situation occurs at a first time point 305. For example, the emergency situation may include a situation different from the event related to the transition of the above-described control authority of FIG. 2. In other words, the emergency situation may include a driving situation not previously stored. For example, the emergency situation may include at least one of an operating error of the autonomous driving control apparatus, an unpredictable situation (e.g., at least one of an accident, a lane departure, an intruding vehicle, an external environment change, or any combination thereof) related to driving of the host vehicle 301, or any combination thereof.

According to an example, if the emergency situation is identified, the autonomous driving control apparatus may omit the waiting time of the first time and/or the execution of a first stage notification, and may immediately perform a second stage notification 360 (e.g., the second stage notification 260 in FIG. 2) at a first time point 305 if an emergency situation occurs. For example, while performing the second stage notification 360 based on the occurrence of an emergency situation, the autonomous driving control apparatus may control the host vehicle 301 based on the second MRM (or MRM stage 2) that decelerates the driving speed of the host vehicle 301 to a second acceleration greater than a first acceleration.

According to an example, during a fourth time 312 from the first time point 305 to a second time point 315, the autonomous driving control apparatus may reduce the driving speed of the host vehicle 301 to the second acceleration. If failing to receive a response regarding the transition of control authority until the second time point 315, the autonomous driving control apparatus may terminate driving of the host vehicle 301. For example, the autonomous driving control apparatus may decelerate the driving speed of the host vehicle 301 to zero, and may deactivate driving of the host vehicle 301 and/or autonomous driving control of the autonomous driving control apparatus.

Figure 4:
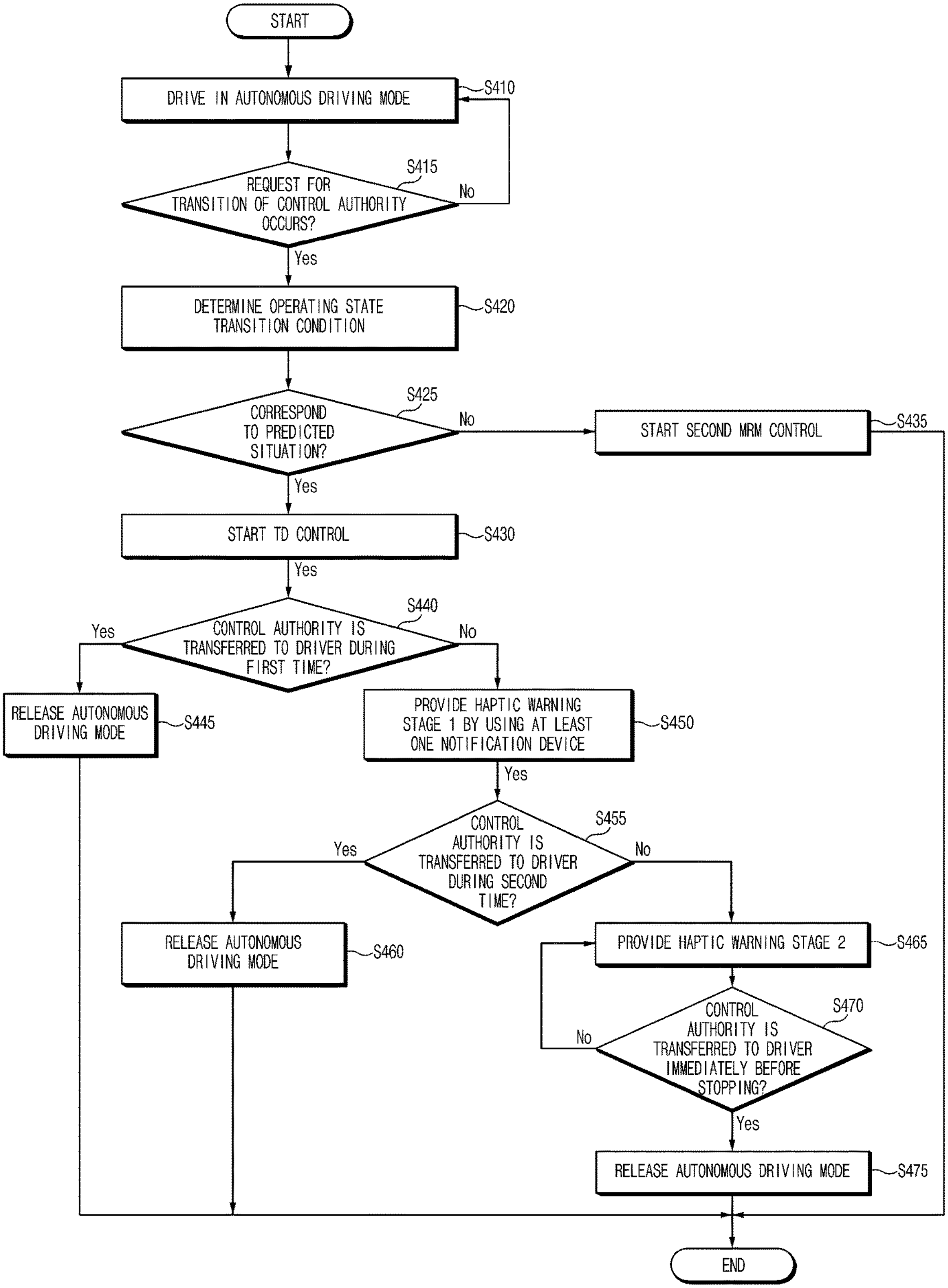
FIG. 4 shows an example of flowchart of an autonomous driving control apparatus, according to an example of the present disclosure.

FIG. 4 shows an example of flowchart of an autonomous driving control apparatus, according to an example of the present disclosure.

According to an example, an autonomous driving control apparatus (e.g., the autonomous driving control apparatus 100 of FIG. 1) may perform operations described in FIG. 4. For example, at least some of components (e.g., the notification device 110, the control device 120, the memory 130, and/or the display device 140 of FIG. 1) included in the autonomous driving control apparatus may be configured to perform the operations of FIG. 4.

In the following example, operation S410 to operation S475 may be sequentially performed, but are not always performed sequentially. For example, the order of operations may be changed, and at least two operations may be performed in parallel. Moreover, descriptions corresponding to or identical to the above-mentioned descriptions given with reference to FIG. 4 may be briefly described or omitted to avoid redundancy. In addition or alternative, at least some of operation S410 to operation S475 may be omitted.

According to an example, the autonomous driving control apparatus may control a host vehicle in an autonomous driving mode (S410).

For example, the autonomous driving control apparatus may control the host vehicle in the autonomous driving mode based on an autonomous driving stage having a specified stage (e.g., level 3) or higher.

According to an example, the autonomous driving control apparatus may determine whether a request for a transition of control authority occurs (S415).

For example, while controlling the host vehicle in the autonomous driving mode, the autonomous driving control apparatus may identify that a situation in which the control authority of the host vehicle needs to be transferred to the user occurs.

For example, if a control authority transition request situation occurs (e.g., operation S415—Yes), the autonomous driving control apparatus may perform operation S420.

For example, if the control authority transition request situation does not occur (e.g., operation S415—No), the autonomous driving control apparatus may repeat operation S410.

According to an example, the autonomous driving control apparatus may determine an operating state transition condition (S420).

For example, the autonomous driving control apparatus may determine the operating state transition condition of the host vehicle. For example, the operating state transition condition may include a condition related to the driving state of the host vehicle.

According to an example, the autonomous driving control apparatus may determine whether the generated situation of the control authority transition request corresponds to a predicted situation (S425).

For example, the predicted situation may include a situation related to the predefined driving of the host vehicle stored in a memory. For example, the predicted situation may include at least one of the traffic volume of a road on which the host vehicle is driving, the driving speed of the host vehicle, the driving state of a vehicle in front of the host vehicle, or any combination thereof. For example, the predicted situation may include predefined reference parameters. In other words, the event may include various pieces of information about the driving situation of the host vehicle stored in advance.

For example, an unpredicted situation may include an emergency situation. For example, the emergency situation may include a situation different from the predicted situation. In other words, the emergency situation may include a driving situation not previously stored. For example, the emergency situation may include at least one of an operating error of the autonomous driving control apparatus, an unpredictable situation (e.g., at least one of an accident, a lane departure, an intruding vehicle, an external environment change, or any combination thereof) related to driving of the host vehicle, or any combination thereof.

For example, if a situation in which the transition of control authority is required is the predicted situation (e.g., operation S425—Yes), the autonomous driving control apparatus may perform operation S430. For example, a case where the situation in which the transition of control authority is required is the predicted situation may be a situation corresponding to the above-described example of FIG. 2. In other words, operations after operation S430 may be replaced with operations of the autonomous driving control apparatus of FIG. 2 described above.

For example, if a situation in which the transition of control authority is required is not the predicted situation (e.g., operation S425—No), the autonomous driving control apparatus may perform operation S435. For example, a case where the situation in which the transition of control authority is required is not the predicted situation may be a situation corresponding to the above-described example of FIG. 3. In other words, operation S435 may be replaced with an operation of the autonomous driving control apparatus of FIG. 3 described above.

According to an example, if the situation in which the transition of control authority is required is not the predicted situation, the autonomous driving control apparatus may start MRM control (S435). Operations of the autonomous driving control apparatus after operation S435 may be replaced with the description of FIG. 3 described above.

According to an example, the autonomous driving control apparatus may start transition demand (TD) control (S430).

For example, the autonomous driving control apparatus may display information about the transition of control authority of a vehicle to the user and may wait for reception of a response regarding a transition of control authority input from the user during a first time.

According to an example, the autonomous driving control apparatus may determine whether the control authority of the host vehicle is transferred to a driver (or user) during the first time (S440).

For example, the autonomous driving control apparatus may determine whether a response regarding the transition of control authority is received from the user during the first time.

For example, if receiving a response regarding the transition of control authority from the user during the first time (e.g., operation S440—Yes), the autonomous driving control apparatus may perform operation S445.

According to an example, the autonomous driving control apparatus may release the autonomous driving mode (S445).

For example, on the basis of receiving the response, the autonomous driving control apparatus may transfer the control authority of the host vehicle to the user and may release (or deactivate) the autonomous driving mode.

For example, if failing to receive the response regarding the transition of control authority from the user during the first time (e.g., operation S440—No), the autonomous driving control apparatus may perform operation S450.

According to an example, the autonomous driving control apparatus may generate a haptic warning stage 1 (e.g., the first stage notification 250 in FIG. 2) by using at least one notification device (S450).

For example, the haptic warning stage 1 may include a first stage notification using a notification device.

For example, the description of the first stage notification may be replaced with the description of the first stage notification of FIGS. 1 and 2 described above.

According to an example, the autonomous driving control apparatus may determine whether the control authority of the host vehicle is transferred to a driver (or user) during a second time (S455).

For example, the autonomous driving control apparatus may determine whether the response regarding the transition of control authority is received from the user during the second time.

For example, if receiving the response regarding the transition of control authority from the user during the second time (e.g., operation S455—Yes), the autonomous driving control apparatus may perform operation S460.

According to an example, the autonomous driving control apparatus may release the autonomous driving mode (S460).

For example, on the basis of receiving the response, the autonomous driving control apparatus may transfer the control authority of the host vehicle to the user and may release (or deactivate) the autonomous driving mode.

For example, if failing to receive the response regarding the transition of control authority from the user during the second time (e.g., operation S455—No), the autonomous driving control apparatus may perform operation S465.

According to an example, the autonomous driving control apparatus may generate a haptic warning stage 2 (e.g., the second stage notification 260 in FIG. 2) (S465).

For example, the haptic warning stage 2 may include a second stage notification using a notification device.

For example, the description of the second stage notification may be replaced with the description of the first stage notification of FIGS. 1 to 3 described above.

According to an example, the autonomous driving control apparatus may determine whether the control authority of the host vehicle is transferred to a driver (or user) immediately before stopping (S470).

For example, while performing the haptic warning stage 2, the autonomous driving control apparatus may determine whether the response regarding the transition of control authority is received from the user. For example, the autonomous driving control apparatus may transfer control authority to the user based on the receipt of the control authority's response.

For example, if the control authority is transferred to the user while haptic warning stage 2 is performed (e.g., operation S470—Yes), the autonomous driving control apparatus may perform operation S475.

According to an example, the autonomous driving control apparatus may release the autonomous driving mode (S475).

For example, on the basis of receiving the response, the autonomous driving control apparatus may transfer the control authority of the host vehicle to the user and may release (or deactivate) the autonomous driving mode.

For example, if the control authority is not transferred to the user while haptic warning stage 2 is performed (e.g., operation S470—No), the autonomous driving control apparatus may repeat operation S465.

Figure 5:
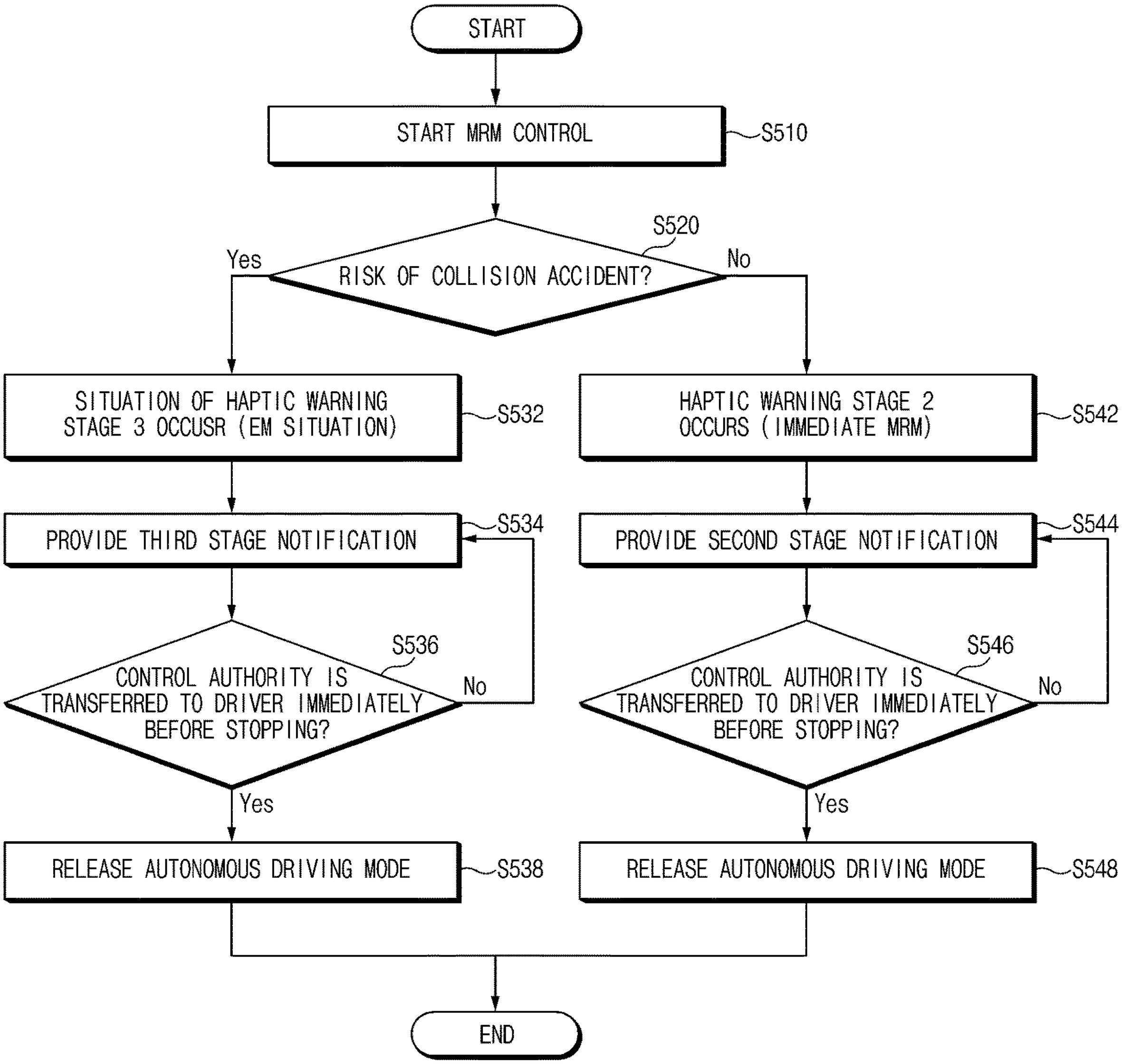
FIG. 5 shows an example of flowchart of an autonomous driving control apparatus, according to an example of the present disclosure.

FIG. 5 shows an example of flowchart of an autonomous driving control apparatus, according to an example of the present disclosure.

According to an example, an autonomous driving control apparatus (e.g., the autonomous driving control apparatus 100 of FIG. 1) may perform operations described in FIG. 5. For example, at least some of components (e.g., the notification device 110, the control device 120, the memory 130, and/or the display device 140 of FIG. 1) included in the autonomous driving control apparatus may be configured to perform the operations of FIG. 5.

In the following example, operation S510 to operation S548 may be sequentially performed, but are not always performed sequentially. For example, the order of operations may be changed, and at least two operations may be performed in parallel. Moreover, descriptions corresponding to or identical to the above-mentioned descriptions given with reference to FIG. 5 may be briefly described or omitted to avoid redundancy.

According to an example, an operation of the autonomous driving control apparatus according to FIG. 5 may be referred to as an operation after it is identified that an emergency situation occurs while the autonomous driving control apparatus performs autonomous driving control on a host vehicle based on the autonomous driving mode of a specified stage or higher.

According to an example, the autonomous driving control apparatus may start MRM control (S510).

For example, the MRM control may be replaced with an operation of the autonomous driving control apparatus of FIG. 3 described above. In other words, the MRM control of operation S510 may be a control operation performed by an autonomous driving control apparatus after the autonomous driving control apparatus omits TD execution.

According to an example, the autonomous driving control apparatus may determine whether there is a risk of collision with the host vehicle (S520).

For example, if there is a risk of collision with the host vehicle (e.g., operation S520—Yes), the autonomous driving control apparatus may perform operation S532 to operation S538.

According to an example, the autonomous driving control apparatus may generate a haptic warning stage 3 (S532).

For example, the autonomous driving control apparatus may perform a third stage notification by using a notification device. For example, the third stage notification may include a notification function having the strongest strength and/or the shortest intensity by using at least one notification device among a plurality of notification devices included in the notification device. In other words, the third stage notification may include the most powerful notification function using a notification device. The occurrence situation of the third stage notification may be defined as EM situation.

For example, the third stage notification may include a notification function that provides a notification to a user by using at least two or more notification devices (e.g., the first notification device and the second notification device in FIG. 1) among a plurality of notification devices included in the notification device.

According to an example, the autonomous driving control apparatus may provide the third stage notification (S534).

For example, on the basis of the period and/or strength corresponding to haptic warning stage 3, the autonomous driving control apparatus may provide a notification function by using at least one of the first notification device, the second notification device, or any combination thereof.

According to an example, the autonomous driving control apparatus may determine whether control authority is transferred to the driver immediately before stopping (S536).

For example, if the control authority of the host vehicle is transferred to the driver immediately before the stop of the host vehicle (e.g., operation S536—Yes), the autonomous driving control apparatus may perform operation S538.

For example, if the control authority of the host vehicle is not transferred to the driver immediately before the stop of the host vehicle (e.g., operation S536—No), the autonomous driving control apparatus may repeat operation S534.

According to an example, the autonomous driving control apparatus may release the autonomous driving mode (S538).

For example, on the basis of receiving the response regarding a transition of control authority from the user, the autonomous driving control apparatus may transfer the control authority of the host vehicle to the user and may release (or deactivate) the autonomous driving mode.

For example, if there is no risk of collision with the host vehicle (e.g., operation S520—No), the autonomous driving control apparatus may perform operation S542 to operation S548.

According to an example, the autonomous driving control apparatus may generate a haptic warning stage 2 (S542).

For example, the autonomous driving control apparatus may perform a second stage notification by using a notification device. For example, the occurrence situation of the second stage notification may be defined as immediate MRM situation. In other words, the second stage notification occurrence situation of operation S542 may be defined as an immediate MRM situation in which TD performance control is omitted and MRM control is performed immediately.

According to an example, the autonomous driving control apparatus may provide the second stage notification (S544).

For example, the autonomous driving control apparatus may activate the first notification device and/or the second notification device based on a period corresponding to haptic warning stage 2. For example, an operating period of the notification function corresponding to haptic warning stage 2 may be longer than an operating period corresponding to haptic warning stage 3 described above. An operating intensity of the notification function corresponding to haptic warning stage 2 may be smaller than an operating intensity corresponding to the haptic warning stage 3 described above.

According to an example, the autonomous driving control apparatus may determine whether control authority is transferred to the driver immediately before stopping (S546).

For example, if the control authority of the host vehicle is transferred to the driver immediately before the stop of the host vehicle (e.g., operation S536—Yes), the autonomous driving control apparatus may perform operation S548.

For example, if the control authority of the host vehicle is not transferred to the driver immediately before the stop of the host vehicle (e.g., operation S546—No), the autonomous driving control apparatus may repeat operation S544.

According to an example, the autonomous driving control apparatus may release the autonomous driving mode (S548).

For example, on the basis of receiving the response regarding a transition of control authority from the user, the autonomous driving control apparatus may transfer the control authority of the host vehicle to the user and may release (or deactivate) the autonomous driving mode.

Figure 6:
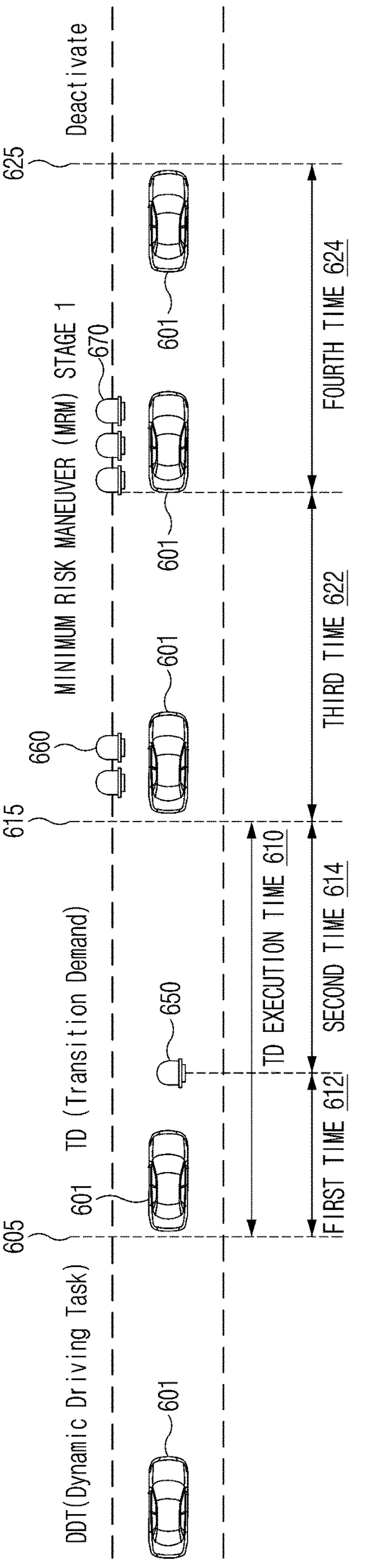
FIG. 6 shows an example of an operation of an autonomous driving control apparatus, according to an example of the present disclosure.

FIG. 6 shows an example of an operation of an autonomous driving control apparatus, according to an example of the present disclosure.

According to an example, among components and operations shown in FIG. 6, descriptions of the same components and operations as those described in FIG. 2 may be referenced and/or replaced with the description of FIG. 2. In other words, an operation of the autonomous driving device according to FIG. 6 may include an operation performed additionally and/or alternatively in the operation of the autonomous driving device of FIG. 2.

According to an example, an autonomous driving control apparatus (e.g., the autonomous driving control apparatus 100 of FIG. 1) may control a host vehicle 601 in an autonomous driving mode. For example, the autonomous driving control apparatus may control the host vehicle 601 in the autonomous driving mode based on an autonomous driving stage having a specified stage (e.g., level 3) or higher.

According to an example, while controlling the host vehicle 601 in the autonomous driving mode based on the autonomous driving mode (e.g., a dynamic driving task (DDT)), the autonomous driving control apparatus may identify that an event related to a transition of control authority of the host vehicle 601 occurs at a first time point 605.

According to an example, at the first time point 605, the autonomous control driving apparatus may display information about the transition of control authority to the user based on identifying the occurrence of the event. For example, the autonomous driving control apparatus may provide the user with various pieces of information indicating the need for user control, by using a display device (e.g., the display device 140 in FIG. 1).

According to an example, if not receiving a response regarding the transition of control authority from the user during a first time 612, the autonomous driving control apparatus may determine whether a first notification device determined based on a specific priority among a plurality of notification devices included in a notification device (e.g., the notification device 110 in FIG. 1) operates normally. For example, if the first notification device is operating normally, the autonomous driving control apparatus may perform a first stage notification 650 by using the first notification device. For example, if the first notification device is not operating normally (e.g., if the first notification device is broken), the autonomous driving control apparatus may perform the first stage notification 650 by using a notification device (e.g., a second notification device) determined based on a specific priority. For example, if receiving a response regarding the transition of control authority from the user during the first time 612, the autonomous driving control apparatus may transfer the control authority of the host vehicle 601 to the user and then may terminate control of autonomous driving mode.

For example, the first stage notification 650 using the first notification device may include a notification function including at least one of adjusting the length of a safety belt corresponding to the user, generating vibration in the seat in which the user is riding, or any combination thereof.

For example, the first stage notification 650 using the first notification device may include an operation of adjusting a length of a safety belt with a first intensity based on a first period by using the safety belt length adjusting device. The first period may include, for example, a first retraction section for winding a safety belt with a first intensity, and a first idle section. The first retraction section and/or the first idle section may be a set value changeable by a user and/or a producer.

For example, the first stage notification 650 using the first notification device may include an operation of generating vibration in at least one area (e.g., a cushion) of a seat, in which the user is riding, with a first intensity based on a first period by using a seat vibrator.

For example, if the first notification device fails at a point in time if the first stage notification 650 needs to be provided, the autonomous driving control apparatus may provide the first stage notification 650 by using another notification device (e.g., a second notification device). For example, the first stage notification 650 using the second notification device may include a notification function of at least one of changing the backrest angle of the seat corresponding to the user based on a specified period, repeatedly applying braking force of a specified magnitude to the host vehicle, or any combination thereof.

For example, the first stage notification 650 using the second notification device may include an operation for adjusting a backrest angle of a seat within a specified angle section by using the seat backrest angle adjusting device, based on the specified period. The first stage notification 650 using the seat backrest angle adjusting device may include, for example, an operation of gradually and repeatedly changing the angle of the seat in a range between a minimum value of a specified angle section and a maximum value of the specified angle section. For example, the specified period may be a set value changeable by a user and/or a producer.

For example, the first stage notification 650 using the second notification device may include an operation of repeatedly applying the braking force of a specified magnitude to the host vehicle 601 by using a braking device. The first stage notification 650 using a braking device may include, for example, an operation of decelerating the driving speed of the host vehicle 601 based on a control signal having a pulse form based on a specified magnitude.

For example, the first stage notification 650 may be performed on the premise that the autonomous driving control apparatus identifies that the user is seated with the seat belt fastened. In other words, the autonomous driving control apparatus may continuously identify whether the seat belt is fastened after the first time point 605. If it is identified seated with the seat belt fastened, the that the user is autonomous driving control apparatus may normally perform the first stage notification 650.

According to an example, if failing to receive a response regarding the transition of control authority from the user during a second time 614 from a point in time if the first stage notification 650 is performed, the autonomous driving control apparatus may perform a second stage notification 660 by using a notification device. For example, if receiving a response regarding the transition of control authority from the user during the second time 614, the autonomous driving control apparatus may transfer the control authority of the host vehicle 601 to the user and then may terminate control of autonomous driving mode.

For example, the second stage notification 660 using the second notification device may include a notification function of at least one of changing the backrest angle of the seat corresponding to the user based on a specified period, repeatedly applying braking force of a specified magnitude to the host vehicle, or any combination thereof.

For example, the second stage notification 660 using the second notification device may include an operation for adjusting a backrest angle of a seat within a specified angle section by using the seat backrest angle adjusting device, based on the specified period. The second stage notification 660 using the seat backrest angle adjusting device may include, for example, an operation of gradually and repeatedly changing the angle of the seat in a range between a minimum value of a specified angle section and a maximum value of the specified angle section. For example, the seat backrest angle adjusting device according to the second stage notification 660 may control the backrest angle of a seat within a shorter period and wider angle section than in the first stage notification 650.

For example, the second stage notification 660 using the second notification device may include an operation of repeatedly applying the braking force of a specified magnitude to the host vehicle 601 by using a braking device. The second stage notification 660 using a braking device may include, for example, an operation of decelerating the driving speed of the host vehicle 601 based on a control signal having a pulse form based on a specified magnitude. For example, the braking device according to the second stage notification 660 may repeatedly decelerate the driving speed of the host vehicle 601 based on a stronger level (e.g., greater deceleration) than in the first stage notification 650.

For example, if the second notification device fails at a point in time if the second stage notification 660 needs to be provided, the autonomous driving control apparatus may provide the second stage notification 660 by using another notification device (e.g., a first notification device). For example, the second stage notification 660 using the first notification device may include a notification function including at least one of adjusting the length of a safety belt corresponding to the user, generating vibration in the seat in which the user is riding, or any combination thereof.

For example, the second stage notification 660 using the first notification device may include an operation for adjusting the length of the safety belt with a second intensity greater than the first intensity by using the safety belt length adjusting device based on the second period shorter than the first period.

For example, the second stage notification 660 using the first notification device may include an operation of generating vibration in at least one area (e.g., a cushion) of a seat, in which the user is riding, with a second intensity based on a second period by using a seat vibrator.

According to an example, a time from the first time point 605, which is a time point at which an event related to the transition of control authority occurs, to a second time point 615, which is a time point at which the second stage notification 660 is executed, may be defined as a transition demand (TD) execution time 610. For example, the TD execution time 610 may be defined as a limit time for informing the user that the transition of control authority is necessary. If the limit time is exceeded, the autonomous driving control apparatus may reduce the driving speed of the host vehicle 601.

According to an example, while the autonomous driving control apparatus is performing the second stage notification 660, the autonomous driving control apparatus may control the host vehicle 601 based on a first MRM (or MRM stage 1) including an operation of decelerating the driving speed of the host vehicle 601 to a first acceleration.

According to an example, while a third time 622 elapses from the second time point 615, which is a time point at which the second stage notification 660 is executed, the autonomous driving control apparatus may reduce the driving speed of the host vehicle 601. Moreover, the autonomous driving control apparatus may provide the user with at least one of a driving situation of the host vehicle 601, information indicating that a transition of control authority is required, or any combination thereof by using a display device (e.g., the display device 140 in FIG. 1) through visual and/or auditory content.

According to an example, while performing the first stage notification 650 or the second stage notification 660, the autonomous driving control apparatus may receive a manual seat angle adjustment input from the user.

For example, while performing the first stage notification 650 or the second stage notification 660 by using a seat angle adjusting device, the autonomous driving control apparatus may receive the manual seat angle adjustment input from the user that lasts during a specific time.

For example, if the specific time, during which the manual seat angle adjustment input continues, exceeds the predefined time, the autonomous driving control apparatus may identify that the corresponding manual seat angle adjustment input is response intent regarding a transition of control authority to the user, and may terminate (or release) autonomous driving control for the host vehicle 601.

For example, if the specific time, during which the manual seat angle adjustment input continues, is not greater than the pre-defined time, the autonomous driving control apparatus may continuously provide a notification or may perform autonomous driving control.

According to an example, if failing to receive a response regarding the transition of control authority until the third time point 625, the autonomous driving control apparatus may terminate driving of the host vehicle 601. For example, the autonomous driving control apparatus may decelerate the driving speed of the host vehicle 601 to zero, and may deactivate driving of the host vehicle 601 and/or autonomous driving control of the autonomous driving control apparatus.

According to an example, if a response for a transition of control authority is not received from the user during the third time 622, the autonomous driving control apparatus may perform a third stage notification 670 during a fourth time 624 up to a third time point 625. For example, the third stage notification include a notification function of providing a notification to the user by using both the first notification device and the second notification device included in the notification device.

For example, the third stage notification 670 may include a notification function, of which an operating intensity is set to an intensity greater than the intensity of the first notification function and the intensity of the second notification function, and of which an operating period is set to an operating period less than the operating period of the first notification function and the operating period of the second notification function.

For example, the third stage notification 670 may include a control function of decelerating the driving speed of the host vehicle with an acceleration having an absolute value greater than the absolute value of the second acceleration used to decelerate the host vehicle 601 during the third time 622.

According to an example, if a response for a transition of control authority is not received from the user during the fourth time 624 from a time point at which the third stage notification 670 is performed, the driving speed of the host vehicle 601 may be reduced until the third time point 625 if the driving speed of the host vehicle 601 is less than a specified value (e.g., 0 m/s). Moreover, the autonomous driving control apparatus may provide the user with at least one of a driving situation of the host vehicle 601, information indicating that a transition of control authority is required, or any combination thereof by using a display device through visual and/or auditory content.

According to an example, if failing to receive a response regarding the transition of control authority until the third time point 625, the autonomous driving control apparatus may terminate driving of the host vehicle 601. For example, the autonomous driving control apparatus may decelerate the driving speed of the host vehicle 601 to zero, and may deactivate driving of the host vehicle 601 and/or autonomous driving control of the autonomous driving control apparatus.

According to an example, the above-described operations performed by the autonomous driving control apparatus as the third notification 670 are examples, and examples of the present disclosure are not limited thereto.

For example, the autonomous driving control apparatus may perform the third stage notification 670 by using at least some of the other components (e.g., a haptic function providing device including at least one of cushion vibration, headrest vibration, sound notification, or any combination thereof) including the above-described examples.

For example, the autonomous driving control apparatus may perform the third stage notification 670 by changing the period of the above-described notification function. For example, as time elapses, the autonomous driving control apparatus may decrease the period of the third stage notification 670.

Figure 7:
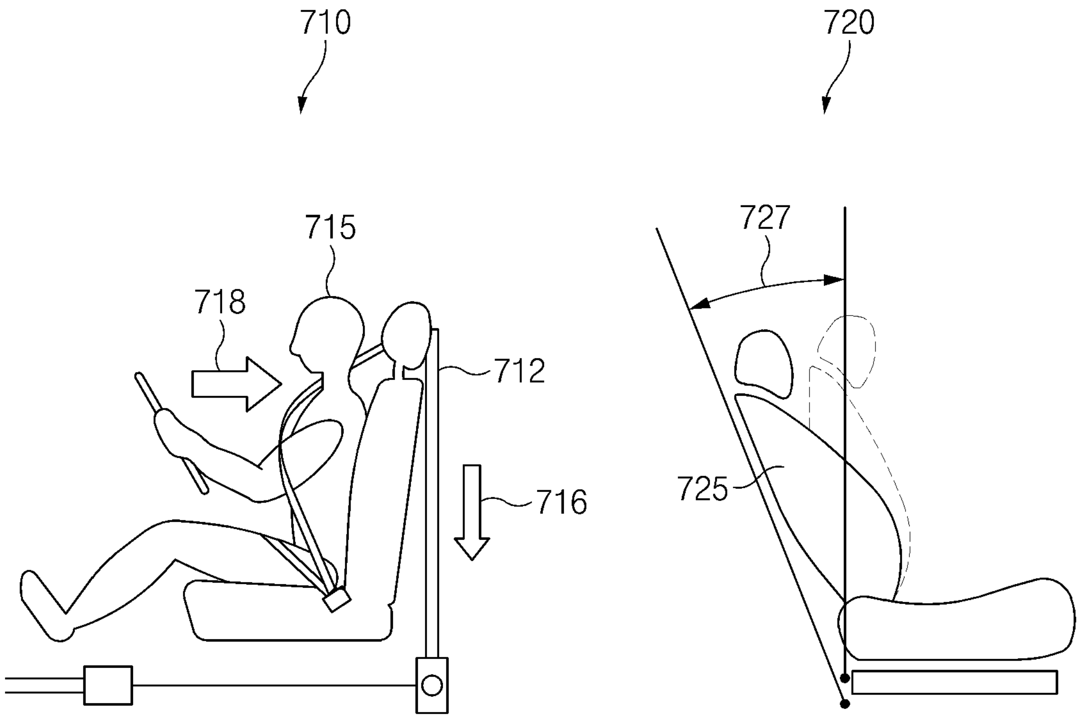
FIG. 7 shows an example of an operation of a notification device, according to an example of the present disclosure.

FIG. 7 shows an example of an operation of a notification device, according to an example of the present disclosure.

According to an example, a notification device (e.g., the notification device 110 of FIG. 1) may include a plurality of notification devices of various types.

Referring to reference number 710, according to an example, the notification device may include a safety belt length adjusting device. The safety belt length adjusting device may be one component of a first notification device among a plurality of notification devices included in the notification device.

For example, the autonomous driving control apparatus may provide a notification function to a first user 715 by retracting a length of a safety belt 712 corresponding to (or fastened to the user's body) the first user 715 by using a safety belt length adjusting device.

For example, the safety belt length adjusting device may wind the safety belt 712 fastened to a part of the body of the first user 715 in a first direction 716. In this case, as the body of the first user 715 moves in a second direction 718, the first user 715 may perceive a notification function by the safety belt length adjusting device.

Referring to reference number 720, according to an example, the notification device may include a seat backrest angle adjusting device. The seat backrest angle adjusting device may be one component of a second notification device among a plurality of notification devices included in the notification device.

For example, the autonomous driving control apparatus may provide a notification function to a second user by changing the angle of a backrest 725 of a seat, in which a second user (not shown) is riding, by using a seat backrest angle adjusting device.

For example, the seat backrest angle adjusting device may repeatedly change the angle of the backrest 725 of the seat, which the second user is riding, within a specified angle range 727. In this case, as the body of the second user moves back and forth depending on the angle of the backrest 725, the second user may perceive the notification function by the seat backrest angle adjusting device.

Figure 8:
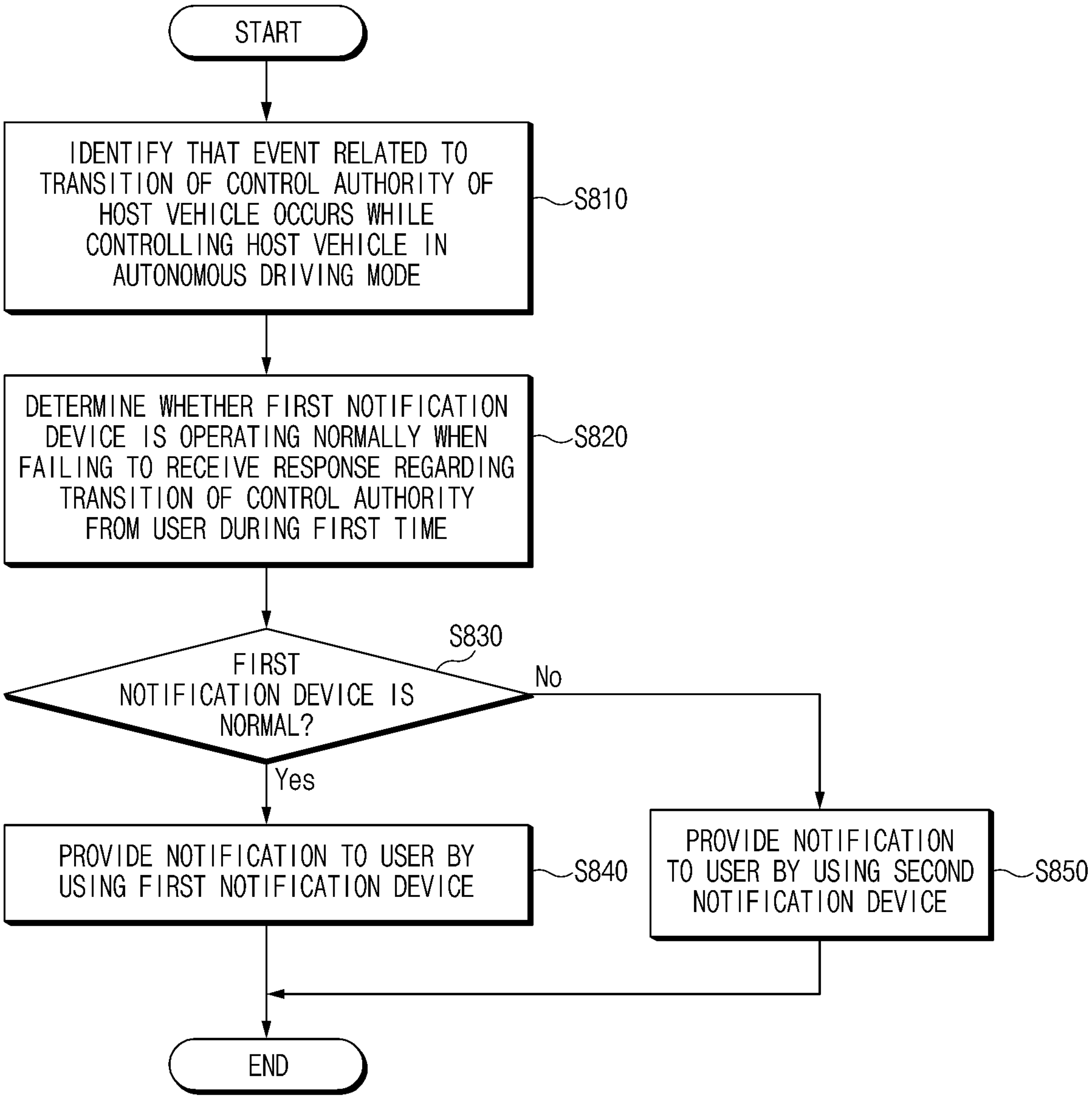
FIG. 8 shows an example of flowchart of an autonomous driving control apparatus, according to an example of the present disclosure.

FIG. 8 shows an example of flowchart illustrating an autonomous driving control method, according to an example of the present disclosure.

According to an example, an autonomous driving control apparatus (e.g., the autonomous driving control apparatus 100 of FIG. 1) may perform operations described in FIG. 8. For example, at least some of components (e.g., the notification device 110, the control device 120, the memory 130, and/or the display device 140 of FIG. 1) included in the autonomous driving control apparatus may be configured to perform the operations of FIG. 8.

In the following example, operation S810 to operation S850 may be sequentially performed, but are not always performed sequentially. For example, the order of operations may be changed, and at least two operations may be performed in parallel. Moreover, descriptions corresponding to or identical to the above-mentioned descriptions given with reference to FIG. 8 may be briefly described or omitted to avoid redundancy.

According to an example, while controlling a host vehicle in an autonomous driving mode, the autonomous driving control apparatus may identify that an event related to a transition of control authority of the host vehicle occurs (S810).

For example, the event related to the transition of control authority of the host vehicle may include information about a driving situation of the host vehicle. For example, the event may include at least one of the traffic volume of a road on which the host vehicle is driving, the driving speed of the host vehicle, the driving state of a vehicle in front of the host vehicle, or any combination thereof. For example, the event may include predefined reference parameters. In other words, the event may include various pieces of information about the driving situation of the host vehicle stored in advance.

For another example, the autonomous driving control apparatus may identify an emergency situation. Descriptions of an operation of the autonomous driving control apparatus if an emergency situation is identified may be replaced with the descriptions of FIG. 3 described above.

According to an example, if failing to receive a response regarding the transition of control authority from the user during a first time, the autonomous driving control apparatus may determine whether a first notification device is operating normally (S820).

For example, the response regarding the transition of control authority may include at least one of steering wheel control of the host vehicle, pressure on an accelerator pedal and/or brake pedal of the host vehicle, a touch input to a display of the host vehicle, or any combination thereof.

According to an example, the autonomous driving control apparatus may determine whether the first notification device is normal (S830).

For example, if the first notification device is operating normally (e.g., operation S830—Yes), the autonomous driving control apparatus may perform operation S840.

For example, if the first notification device is not operating normally (e.g., operation S830—No), the autonomous driving control apparatus may perform operation S850.

According to an example, the autonomous driving control apparatus may provide a notification to a user by using the first notification device (S840).

For example, if the first notification device is operating normally, the autonomous driving control apparatus may provide the user with a notification including at least one of adjusting a length of a safety belt corresponding to the user by using the first notification device, generating vibration in the seat in which the user is riding by using the first notification device, or any combination thereof.

According to an example, the autonomous driving control apparatus may provide a notification to the user by using a second notification device (S850).

For example, if the first notification device is not operating normally, the autonomous driving control apparatus may provide the user with a notification including at least one of changing a backrest angle of the seat corresponding to the user based on a specified period by using the second notification device, repeatedly applying braking force of a specified magnitude to the host vehicle, or any combination thereof.

Figure 9:
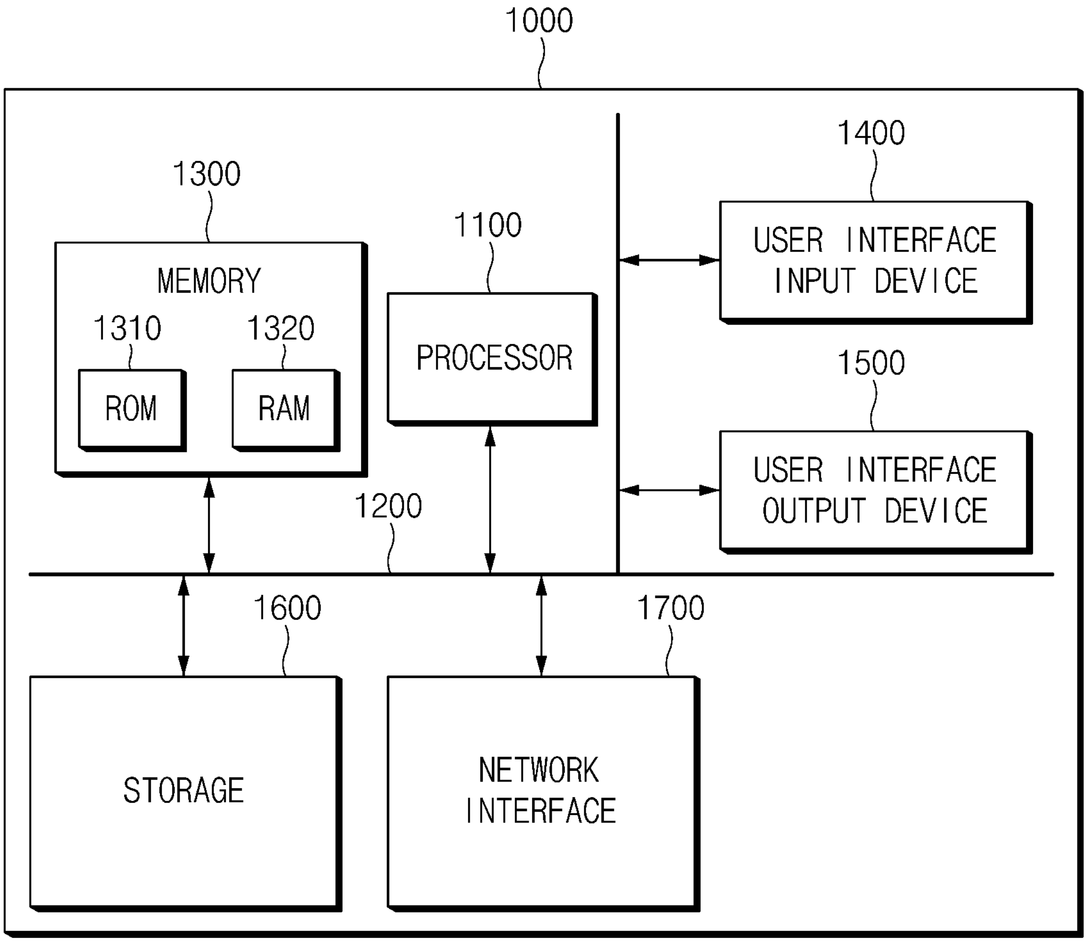
FIG. 9 shows an example of a computing system related to an autonomous driving control method, according to an example of the present disclosure.

FIG. 9 shows an example of a computing system related to an autonomous driving control method, according to an example of the present disclosure.

Referring to FIG. 9, a computing system 1000 related to an autonomous driving control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The present disclosure has been made to solve the above-mentioned problems occurring in the prior art while advantages achieved by the prior art are maintained intact.

An example of the present disclosure provides an autonomous driving control apparatus that provides a user with different types of notification functions step by step by using a notification device based on at least one of various periods, intensities, or any combination thereof, if recognizing the need to a transition of control authority, and a method thereof.

An example of the present disclosure provides an autonomous driving control apparatus that provides a user with a notification function by selectively using a first notification device including at least one of a safety belt length adjusting device, a seat vibrator, or any combination thereof, and a second notification device including at least one of a seat backrest angle adjusting device, a host vehicle speed adjusting device (e.g., braking device), or any combination thereof, and a method thereof.

An example of the present disclosure provides an autonomous driving control apparatus that provides a user with a notification function by selectively using at least one of the remaining notification devices if a problem occurs in an operating state of at least one of a plurality of notification devices.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an autonomous driving control apparatus includes a notification device including a first notification device and a second notification device, a memory that stores instructions, and a control device operatively connected to the notification device and the memory. For example, the instructions, when executed by the control device, cause the autonomous driving control apparatus to identify that an event related to a transition of control authority of the host vehicle occurs while controlling a host vehicle in an autonomous driving mode, to determine whether the first notification device is operating normally if failing to receive a response regarding the transition of the control authority from a user during a first time, to provide the user with a notification by using the first notification device if the first notification device is operating normally, and to provide the user with the notification by using the second notification device if the first notification device is not operating normally.

According to an example, the instructions, when executed by the control device, may cause the autonomous driving control apparatus to provide the notification to the user by using the second notification device if failing to receive the response regarding the transition of the control authority from the user during a second time from a time point at which the notification starts to be provided by using the first notification device, and to control the host vehicle based on a first minimum risk maneuver (MRM) including an operation of decelerating the driving speed of the host vehicle with a first acceleration while providing the notification to the user by using the second notification device.

According n example, the instructions, when executed by the control device, may cause the autonomous driving control apparatus to provide the notification to the user by using both the first notification device and the second notification device if failing to receive the response regarding the transition of the control authority from the user during a third time from a time point at which the notification starts to be provided to the user by using the second notification device.

According to an example, the autonomous driving control apparatus may further include a display device. For example, the instructions, when executed by the control device, may cause the autonomous driving control apparatus to provide, by using the display device, the user with information about at least one of the event related to the transition of the control authority, the notification using the first notification device, the notification using the second notification device, or a combination of the event, the notification using the first notification device, and the notification using the second notification device.

According to an example, the instructions, when executed by the control device, may cause the autonomous driving control apparatus to provide the notification to the user immediately by using the first notification device while controlling the host vehicle in the autonomous driving mode, if an operating error of the autonomous driving control apparatus, an unpredictable situation, or a combination of the operating error and the unpredictable situation occurs.

According to an example, the instructions, when executed by the control device, may cause the autonomous driving control apparatus to control the host vehicle based on a second MRM including an operation of decelerating the driving speed of the host vehicle with a second acceleration greater than a first acceleration while immediately providing the notification to the user by using the first notification device.

According to an example, the instructions, when executed by the control device, may cause the autonomous driving control apparatus to provide the user with the notification including at least one of adjusting a length of a safety belt corresponding to the user, generating vibration in a seat, in which the user is riding, by using the first notification device, or a combination of the adjusting of the length of the safety belt and the generating the vibration, by using the first notification device if the first notification device is operating normally.

According to an example, the instructions, when executed by the control device, may cause the autonomous driving control apparatus to provide the user with a notification including at least one of changing a backrest angle of a seat corresponding to the user based on a specified period, repeatedly applying braking force of a specified magnitude to the host vehicle, or a combination of the changing of the backrest angle and the applying of the braking force, by using the second notification device if the first notification device is not operating normally.

According to an example, the instructions, when executed by the control device, may cause the autonomous driving control apparatus to repeatedly apply the braking force of the specified magnitude in a form of a pulse by using the second notification device.

According to an example, the instructions, when executed by the control device, may cause the autonomous driving control apparatus to turn off the notification device and terminate the autonomous driving mode if receiving the response regarding the transition of the control authority from the user during the first time or the second time.

According to an example of the present disclosure, an autonomous driving control method includes identifying, by a control device, that an event related to a transition of control authority of the host vehicle occurs while controlling a host vehicle in an autonomous driving mode, determining, by the control device, whether a first notification device is operating normally if failing to receive a response regarding the transition of the control authority from a user during a first time, providing, by the control device, the user with a notification by using the first notification device if the first notification device is operating normally, and providing, by the control device, the user with the notification by using a second notification device if the first notification device is not operating normally.

According to an example, the autonomous driving control method may further include providing, by the control device, the notification to the user by using the second notification device if failing to receive the response regarding the transition of the control authority from the user during a second time from a time point at which the notification starts to be provided by using the first notification device, and controlling, by the control device, the host vehicle based on a first MRM including an operation of decelerating the driving speed of the host vehicle with a first acceleration while providing the notification to the user by using the second notification device.

According to an example, the autonomous driving control method may further include providing, by the control device, the notification to the user by using both the first notification device and the second notification device if failing to receive the response regarding the transition of the control authority from the user during a third time from a time point at which the notification starts to be provided to the user by using the second notification device.

According to an example, the autonomous driving control method may further include providing, by the control device, the user with information about at least one of the event related to the transition of the control authority, the notification using the first notification device, the notification using the second notification device, or a combination of the event, the notification using the first notification device, and the notification using the second notification device by using a display device.

According to an example, the autonomous driving control method may further include providing, by the control device, the notification to the user immediately by using the first notification device while controlling the host vehicle in the autonomous driving mode, if an operating error of an autonomous driving control apparatus, an unpredictable situation, or a combination of the operating error and the unpredictable situation occurs.

According to an example, the providing of the notification to the user immediately by using the first notification device may include controlling, by the control device, the host vehicle based on a second MRM including an operation of decelerating the driving speed of the host vehicle with a second acceleration greater than a first acceleration while immediately providing the notification to the user by using the first notification device.

According to an example, the providing, by the control device, of the user with the notification by using the first notification device if the first notification device is operating normally may include providing, by the control device, the user with the notification including at least one of adjusting a length of a safety belt corresponding to the user, generating vibration in a seat, in which the user is riding, by using the first notification device, or a combination of the adjusting of the length of the safety belt and the generating the vibration, by using the first notification device if the first notification device is operating normally.

According to an example, the providing, by the control device, of the user with the notification by using the second notification device if the first notification device is not operating normally may include providing, by the control device, the user with a notification including at least one of changing a backrest angle of a seat corresponding to the user based on a specified period, repeatedly applying braking force of a specified magnitude to the host vehicle, or a combination of the changing of the backrest angle and the applying of the braking force, by using the second notification device if the first notification device is not operating normally.

According to an example, the applying, by the control device, of the braking force of the specified magnitude to the host vehicle repeatedly may further include repeatedly applying, by the control device, the braking force of the specified magnitude in a form of a pulse by using the second notification device.

According to an example, the autonomous driving control method may further include turning off the notification device including the first notification device and the second notification device and terminating the autonomous driving mode if receiving the response regarding the transition of the control authority from the user during the first time or the second time.

The above description is merely an example of the technical idea of the present disclosure, and various modifications and modifications may be made by one skilled in the art without departing from the essential characteristic of the present disclosure.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

Descriptions of an autonomous driving control apparatus according to an example of the present disclosure, and a method thereof are as follows.

According to at least one of examples of the present disclosure, if a situation in which control authority needs to be transferred to a user is identified while controlling a host vehicle based on an autonomous driving mode, an autonomous driving control apparatus may a provide user with a notification about a transition of control authority by using at least part of various types of notification devices.

Moreover, according to at least one of examples of the present disclosure, an autonomous driving control apparatus may provide a notification about a transition of control authority by using a component positioned in a host vehicle, thereby reducing manufacturing costs.

Furthermore, according to at least one of examples of the present disclosure, it is possible to perform driving control of the host vehicle while a consistent and comfortable driving feeling is maintained, by not using a parameter related to the driving environment of the host vehicle.

Besides, according to at least one of examples of the present disclosure, if at least one of the plurality of notification devices included in the host vehicle does not operate normally, a notification function may be adaptively provided by using one of the remaining notification devices operating normally.

Besides, a variety of effects directly or indirectly understood through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for autonomous driving control, the apparatus comprising:

a feedback device including a first feedback device and a second feedback device;

a memory configured to store instructions; and a control device operatively connected to the feedback device and the memory, wherein the instructions, when executed by the control device, cause the apparatus to:

detect an event related to a transition of control authority of a host vehicle in an autonomous driving mode;

based on failing to receive a response regarding the transition of the control authority from a user during a first time period, determine whether the first feedback device is operating in a normal state;

based on a determination that the first feedback device is operating in the normal state, output a first feedback via the first feedback device;

based on a determination that the first feedback device is not operating in the normal state, output a second feedback via the second feedback device; and based on a user input for controlling the first feedback device or the second feedback device, deactivate the autonomous driving mode and transfer the control authority of the host vehicle to the user.

2. The apparatus of claim 1, wherein the instructions, when executed by the control device, cause the apparatus to:

based on failing to receive the response regarding the transition of the control authority from the user during a second time period, output the second feedback via the second feedback device, wherein the second time period is associated with a feedback output time of the first feedback device; and while outputting the second feedback, control the host vehicle based on a first minimum risk maneuver (MRM) including an operation of decelerating a driving speed of the host vehicle with a first deceleration, wherein at least one of the first feedback device or the second feedback device comprises a motor assembly configured to control movement of a vehicle part associated with a driver of the host vehicle.

3. The apparatus of claim 2, wherein the instructions, when executed by the control device, cause the apparatus to:

based on failing to receive the response regarding the transition of the control authority from the user during a third time period, output a plurality of feedbacks via both the first feedback device and the second feedback device, wherein the third time period is associated with a feedback output time of the second feedback device.

4. The apparatus of claim 2, wherein the instructions, when executed by the control device, cause the apparatus to:

based on receiving the user input for controlling the first feedback device or the second feedback device during the first time period or the second time period, determine the user input as the response regarding the transition of the control authority, and based on the response regarding the transition of the control authority, turn off the feedback device and deactivate the autonomous driving mode, wherein the user input comprises an input for controlling a seat angle adjusting device, which operates as the first feedback device or the second feedback device.

5. The apparatus of claim 1, further comprising:

a display device, wherein the instructions, when executed by the control device, cause the apparatus to:

output, by using the display device, information about at least one of:

the event related to the transition of the control authority, the first feedback, the second feedback, or a combination of the event, the first feedback, and the second feedback.

6. The apparatus of claim 1, wherein the instructions, when executed by the control device, cause the apparatus to:

based on an occurrence of an operating error of the apparatus, an unpredictable situation, or a combination of the operating error and the unpredictable situation in the autonomous driving mode, output a third feedback via at least one of the first feedback device or the second feedback device.

7. The apparatus of claim 6, wherein the instructions, when executed by the control device, cause the apparatus to:

while outputting the first feedback, control the host vehicle based on a second minimum risk maneuver (MRM) including an operation of decelerating a driving speed of the host vehicle with a second deceleration greater than a first deceleration associated with a first MRM.

8. The apparatus of claim 1, wherein the instructions, when executed by the control device, cause the apparatus to:

based on the first feedback device operating in the normal state, output the first feedback by performing at least one of:

adjusting a length of a safety belt associated with the user, generating vibration in a seat associated with the user, or a combination of the adjusting of the length of the safety belt and the generating the vibration, and based on the user input for controlling the first feedback device being received after outputting the first feedback or based on the user input for controlling the second feedback device being received after outputting the second feedback, determine the user input as a user confirmation for a transfer of the control authority of the host vehicle to the user.

9. The apparatus of claim 1, wherein the instructions, when executed by the control device, cause the apparatus to:

based on the first feedback device not operating in the normal state, output the second feedback by performing at least one of:

changing a backrest angle of a seat associated with the user based on a specified period, repeatedly applying braking force of a specified magnitude to the host vehicle, or a combination of the changing of the backrest angle and the repeatedly applying of the braking force.

10. The apparatus of claim 9, wherein the instructions, when executed by the control device, cause the apparatus to:

output the second feedback by repeatedly applying the braking force of the specified magnitude in a form of a pulse by using the second feedback device.

11. A method for autonomous driving control, the method comprising:

detecting, by a control device, an event related to a transition of control authority of a host vehicle in an autonomous driving mode;

based on failing to receive a response regarding the transition of the control authority from a user during a first time period, determining, by the control device, whether a first feedback device is operating in a normal state;

based on a determination that the first feedback device is not operating in the normal state, controlling, by the control device, output of a second feedback via a second feedback device, wherein the second feedback is different from a first feedback associated with the first feedback device; and based on a user input for controlling the first feedback device or the second feedback device, deactivating the autonomous driving mode and transferring the control authority of the host vehicle to the user.

12. The method of claim 11, further comprising:

based on failing to receive the response regarding the transition of the control authority from the user during a second time period, controlling, by the control device, output of the second feedback, wherein the second time period is associated with a feedback output time of the first feedback device; and while outputting the second feedback, controlling, by the control device, the host vehicle based on a first minimum risk maneuver (MRM) including an operation of decelerating a driving speed of the host vehicle with a first deceleration.

13. The method of claim 12, further comprising:

based on failing to receive the response regarding the transition of the control authority from the user during a third time period, controlling, by the control device, output of a plurality of feedbacks via both the first feedback device and the second feedback device, wherein the third time period is associated with a feedback output time of the second feedback device.

14. The method of claim 12 wherein the deactivating of the autonomous driving mode and transferring of the control authority of the host vehicle to the user comprises:

based on receiving the user input for controlling the first feedback device or the second feedback device during the first time period or the second time period, determining the user input as the response regarding the transition of the control authority;

based on the response regarding the transition of the control authority, turning off the first feedback device and the second feedback device and deactivating the autonomous driving mode; and transferring the control authority of the host vehicle to the user, wherein the user input comprises an input for controlling a seat angle adjusting device, which operates as the first feedback device or the second feedback device.

15. The method of claim 11, further comprising:

controlling, by the control device and by using a display device, output of information about at least one of:

the event related to the transition of the control authority, the first feedback, the second feedback, or a combination of the event, the first feedback, and the second feedback.

16. The method of claim 11, further comprising:

based on an occurrence of an operating error of an autonomous driving control apparatus, an unpredictable situation, or a combination of the operating error and the unpredictable situation in the autonomous driving mode, controlling, by the control device, output of a third feedback via at least one of the first feedback device or the second feedback device.

17. The method of claim 16, further comprising:

while outputting the first feedback, controlling, by the control device, the host vehicle based on a second minimum risk maneuver (MRM) including an operation of decelerating a driving speed of the host vehicle with a second deceleration greater than a first deceleration associated with a first MRM.

18. The method of claim 11, further comprising:

controlling, by the control device, output of the first feedback by performing at least one of:

adjusting a length of a safety belt associated with the user, generating vibration in a seat associated with the user, or a combination of the adjusting of the length of the safety belt and the generating the vibration.

19. The method of claim 11, wherein the controlling of the output of the second feedback comprises:

controlling, by the control device, the output of the second feedback by performing at least one of:

changing a backrest angle of a seat associated with the user based on a specified period, repeatedly applying braking force of a specified magnitude to the host vehicle, or a combination of the changing of the backrest angle and the repeatedly applying of the braking force.

20. The method of claim 19, wherein the repeatedly applying the braking force comprises:

repeatedly applying, by the control device, the braking force of the specified magnitude in a form of a pulse by using the second feedback device.

* * * * *